US010890384B2

(12) United States Patent
Rassmus et al.

(10) Patent No.: US 10,890,384 B2
(45) Date of Patent: Jan. 12, 2021

(54) PLATE HEAT EXCHANGER

(71) Applicant: Alfa Laval Corporate AB, Lund (SE)

(72) Inventors: Jens Rassmus, Malmö (SE); Tobias Hedlund, Helsingborg (SE)

(73) Assignee: ALFA LAVAL CORPORATE AB, Lund (SE)

( * ) Notice: Subject to any disclaimer, the term of this patent is extended or adjusted under 35 U.S.C. 154(b) by 156 days.

(21) Appl. No.: 16/282,416

(22) Filed: Feb. 22, 2019

(65) Prior Publication Data
US 2020/0271394 A1     Aug. 27, 2020

(51) Int. Cl.
*F28F 3/08*       (2006.01)
*F28F 99/00*      (2006.01)
*F28F 9/007*      (2006.01)

(52) U.S. Cl.
CPC ............. *F28F 3/083* (2013.01); *F28F 99/00* (2013.01); *F16B 2200/506* (2018.08); *F28F 9/0075* (2013.01); *F28F 2275/143* (2013.01); *F28F 2280/02* (2013.01)

(58) Field of Classification Search
CPC .......... F28F 3/08; F28F 3/083; F28F 2280/02; F28F 9/0075; F28F 5/00; F28F 9/001; F28F 99/00; F28F 2275/143; F28F 2275/20; F28F 2275/205; F28F 2280/10; F28D 9/00; F28D 9/0037; F28D 11/06
See application file for complete search history.

(56) References Cited

U.S. PATENT DOCUMENTS

| 1,542,803 A | | 6/1925 | Charles et al. |
| 1,754,857 A | | 4/1930 | Dex |
| 1,809,188 A | | 6/1931 | Barnes |
| 2,182,556 A | * | 12/1939 | Griswold ............ A23B 7/0408 62/63 |
| 2,252,283 A | | 8/1941 | Brase |
| 2,585,113 A | | 2/1952 | Gredell |
| 2,610,834 A | | 9/1952 | Dalzell |

(Continued)

FOREIGN PATENT DOCUMENTS

| EP | 1462752 A2 | 9/2004 |
| EP | 2051035 B1 | 12/2014 |

(Continued)

*Primary Examiner* — Jianying C Atkisson
*Assistant Examiner* — Jose O Class-Quinones
(74) *Attorney, Agent, or Firm* — Buchanan Ingersoll & Rooney PC

(57) ABSTRACT

A plate heat exchanger includes heat exchanger plates positioned between two end plates, a plurality of threaded tightening bolts each extending between one of the end plates and a drive unit, and through the other end plate, and a plurality of motors collectively defining the drive unit. The threaded tightening bolts each include a bolt head that bears directly/indirectly against the first or second end plate. A nut is in threaded engagement with each threaded tightening bolt and bears directly or indirectly against the second or first end plate so that the bolt head/nut associated with each threaded tightening bolt bear directly or indirectly against different ones of the first and second end plates. Each of the motors is operatively connected to a respective one of the threaded tightening bolts so that each of the threaded tightening bolts is rotatable independently of others of the threaded tightening bolts.

18 Claims, 9 Drawing Sheets

(56) References Cited

U.S. PATENT DOCUMENTS

| | | | |
|---|---|---|---|
| 2,621,028 A | 12/1952 | Newhall | |
| 2,639,126 A | 5/1953 | Newhall | |
| 3,077,120 A | 2/1963 | Viehweger | |
| 3,194,530 A | 7/1965 | Heyl | |
| 3,334,495 A | 8/1967 | Jensen et al. | |
| 3,388,614 A | 6/1968 | De | |
| 3,545,018 A | 12/1970 | Peterson | |
| 4,119,388 A | 10/1978 | Armitage | |
| 4,414,070 A | 11/1983 | Spence | |
| 4,480,609 A | 11/1984 | Hayashi | |
| 4,501,644 A * | 2/1985 | Thomas | C10B 7/10 202/104 |
| 4,813,478 A | 3/1989 | Joensson et al. | |
| 5,056,590 A | 10/1991 | Bohn | |
| 5,139,664 A | 8/1992 | Davis | |
| 5,462,112 A | 10/1995 | Johansson | |
| 6,158,237 A * | 12/2000 | Riffat | F03G 6/003 62/484 |
| 6,899,163 B2 * | 5/2005 | Finch | F28F 3/083 165/166 |
| 8,540,013 B1 * | 9/2013 | Sanders | F28F 9/0075 165/166 |
| 9,132,538 B2 | 9/2015 | Qi et al. | |
| 2004/0188060 A1 | 9/2004 | Finch et al. | |
| 2004/0251167 A1 * | 12/2004 | Gingras | B09C 1/06 208/150 |
| 2008/0156466 A1 * | 7/2008 | Schmelz | F28D 9/0093 165/41 |
| 2009/0095457 A1 | 4/2009 | Nyander | |
| 2013/0213188 A1 | 8/2013 | Qi et al. | |
| 2013/0284412 A1 * | 10/2013 | Forstenius | F16B 43/00 165/166 |
| 2016/0097605 A1 | 4/2016 | Finch et al. | |
| 2016/0116221 A1 | 4/2016 | Sheaffer et al. | |

FOREIGN PATENT DOCUMENTS

| | | |
|---|---|---|
| GB | 1364705 A | 8/1974 |
| JP | 10192130 A | 7/1998 |

* cited by examiner

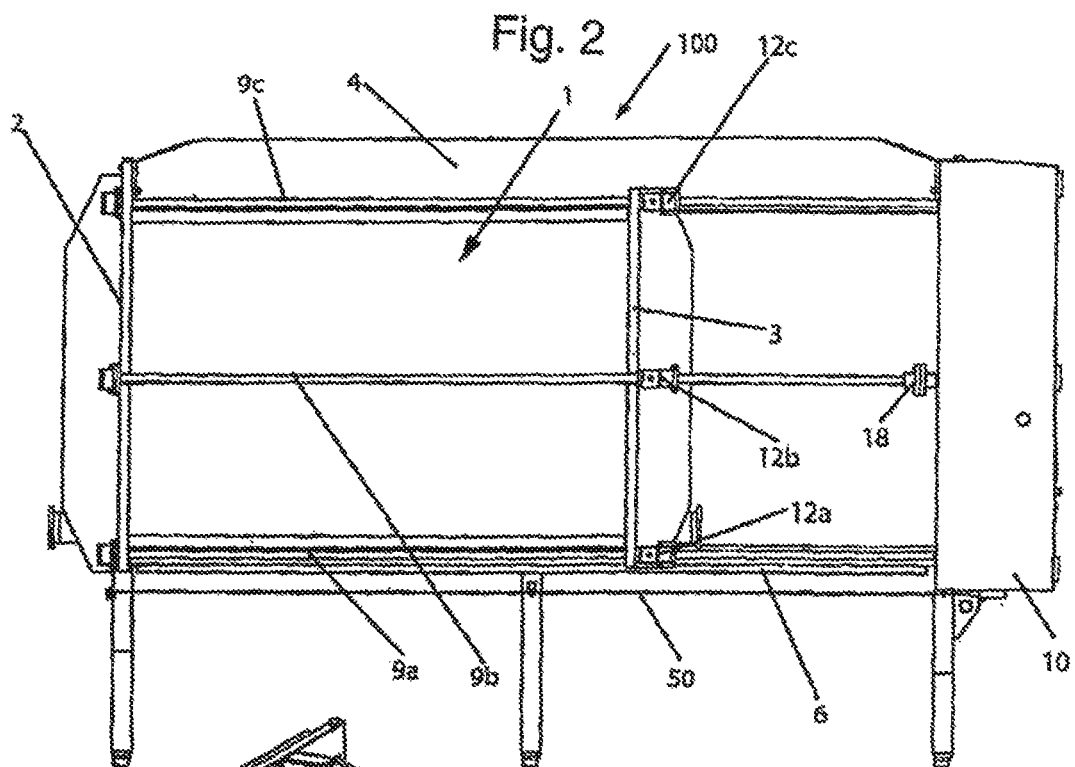
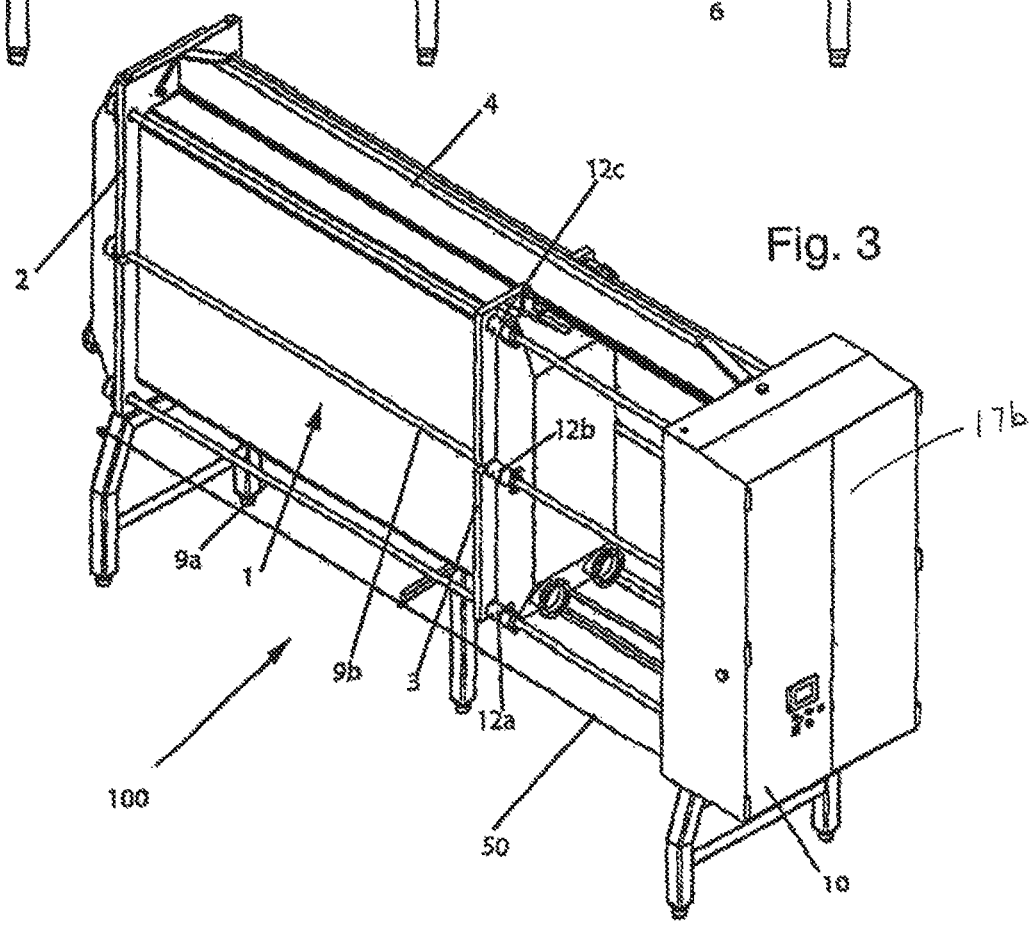

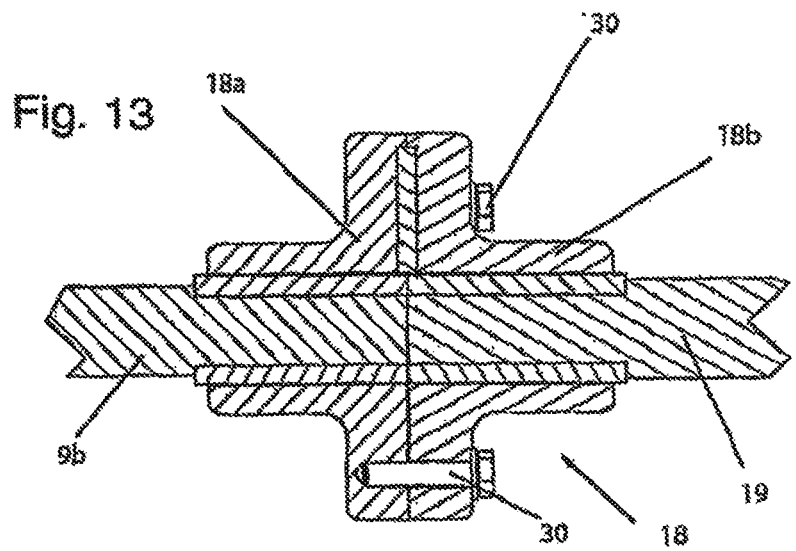
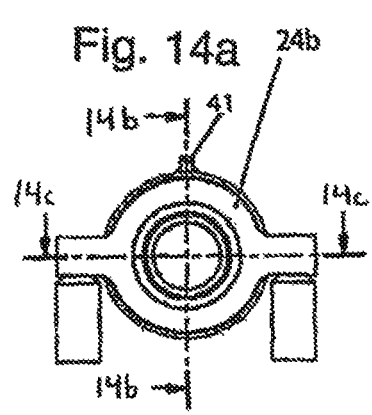
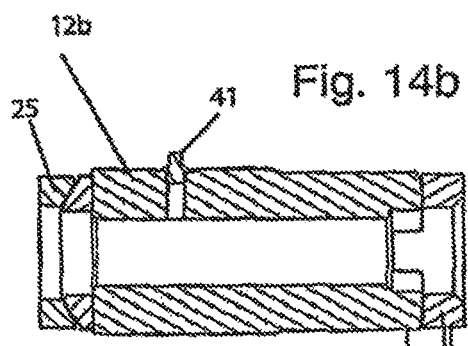
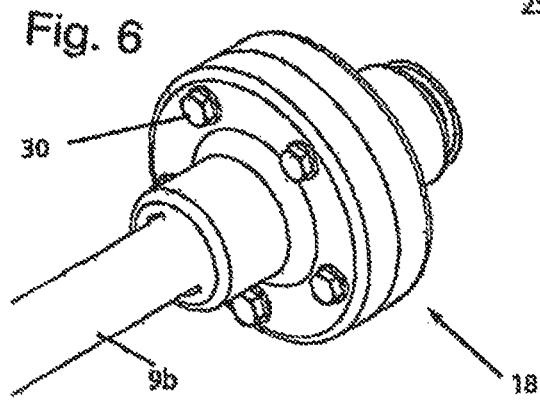
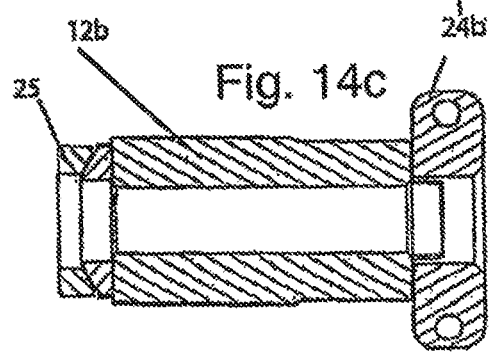

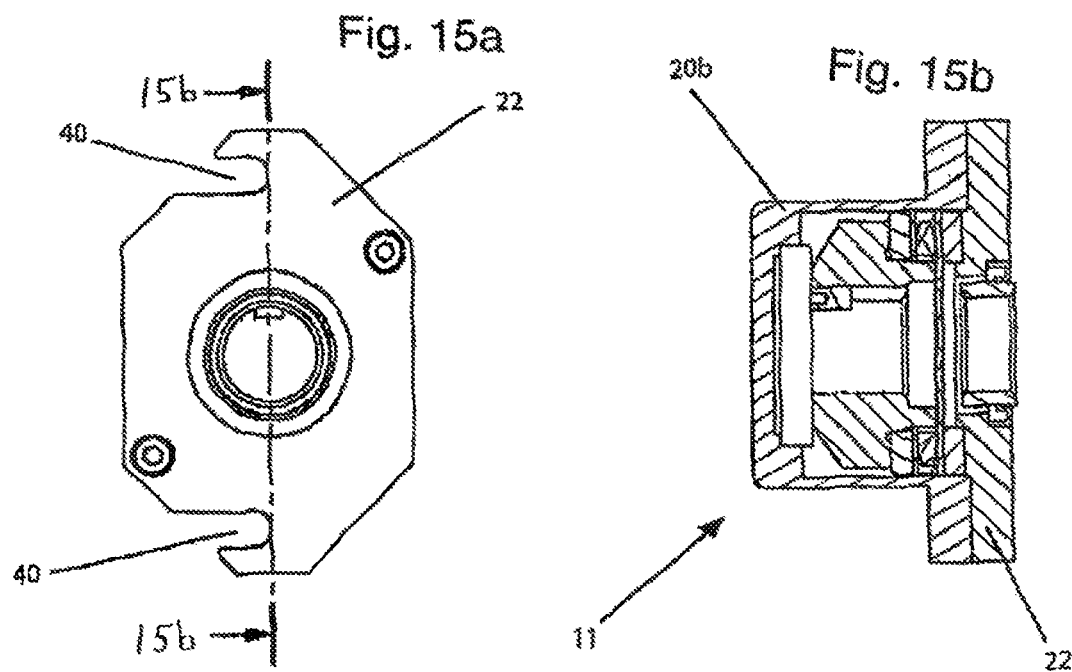
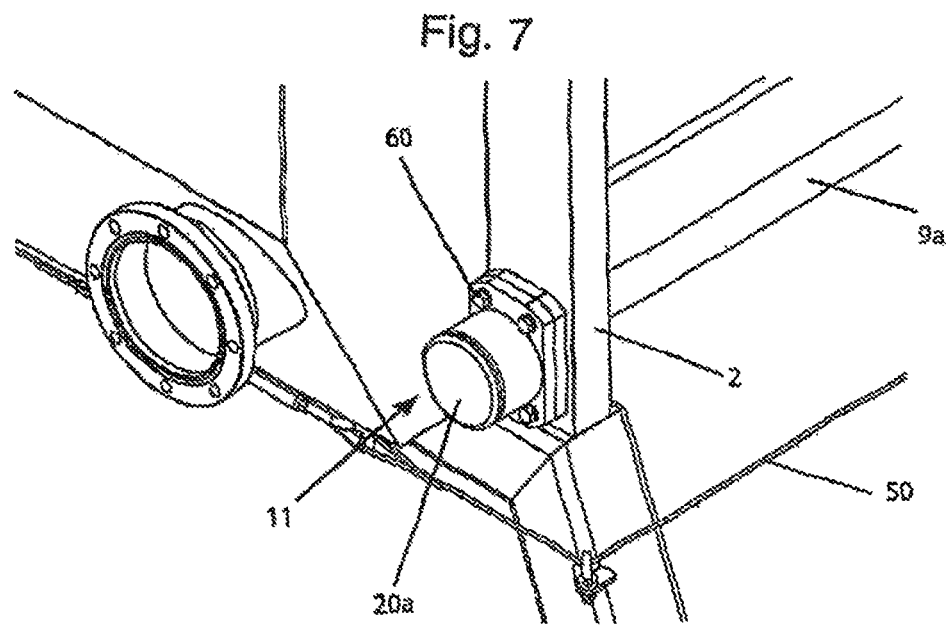

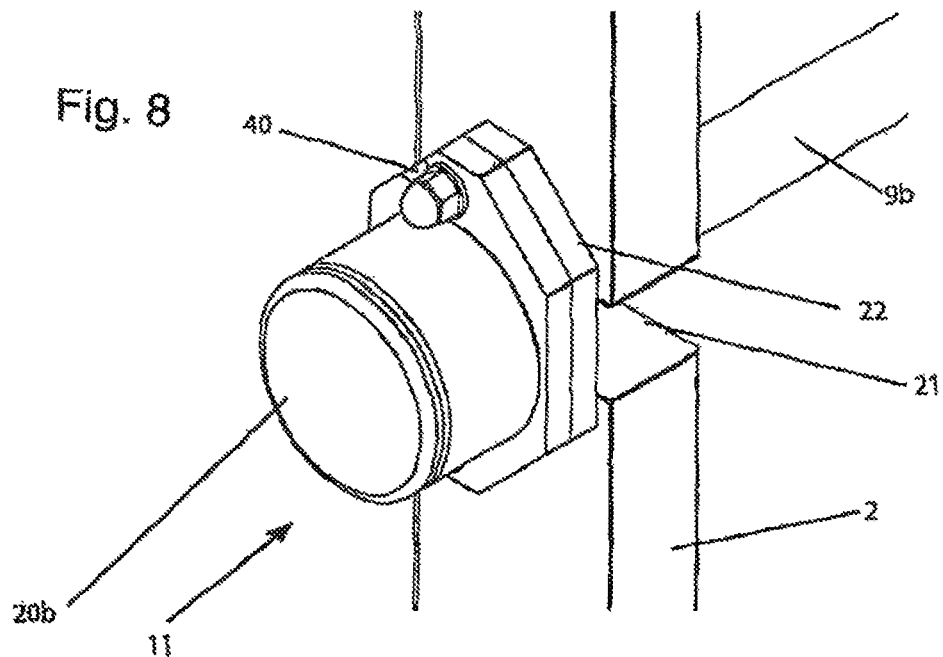
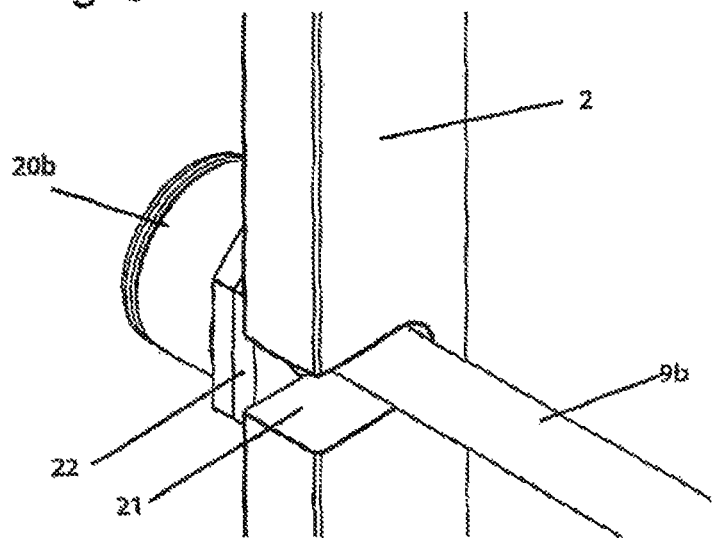

PLATE HEAT EXCHANGER

TECHNOLOGICAL FIELD

The disclosure generally relates to a plate heat exchanger of the kind that includes a package of heat transferring plates and two end plates between which the package of heat transferring plates are kept together. More specifically, the disclosure involves a plate heat exchanger having an arrangement for automatically opening the plate heat exchanger for permitting inspection, cleaning, repair, insertion, replacement and/or removal of heat transferring plates and the like.

BACKGROUND DISCUSSION

A plate heat exchanger of the kind generally described above may need to be opened relatively often, for example once every day depending upon the application or industry to permit inspection and/or cleaning of the heat transferring plates. This may require the removal of one or more plates for closer inspection or cleaning. Typically, one of the end plates is fixed while the other is movable. The movable plate is movable towards the fixed end plate to close the plate heat exchanger and is movable away from the fixed end plate to open the plate heat exchanger. Tightening bolts with nuts may be used to keep the end plates together. To open the plate heat exchanger by moving the movable end plate, either the bolts or the nuts have to be rotated, so that the end plates and thus the heat transferring plates may be moved away from each other.

An example of such a plate heat exchange is disclosed in U.S. Application Publication No. 2009/0095457. This plate heat exchanger includes a drive unit for moving the movable end plate relative to the fixed end plate. The drive unit includes a motor which drives the tightening bolts (six tightening bolts) in a synchronized manner. The drive unit also includes a gear box arranged on each tightening bolt to reduce the required motor torque, and the gear boxes are connected to the motor by a shaft-and-belt arrangement. The shaft-and-belt arrangement is configured so that three of the gear boxes are connected to each other by one set of gear box shafts and the other three gear boxes are connected to each other by other gear box shafts. The gear box shafts are connected to the motor by belts. The operation of the motor results in rotation of the motor shaft, and this rotation of the motor shaft is transferred to the gear box shafts by way of the belts and further to the gear boxes to drive all the tightening bolts in a synchronized manner, thereby moving the movable end plate relative to the fixed end plate.

This known drive unit, while suited to rotate the tightening bolts to move the movable end plate relative to the fixed end plate, is susceptible of various improvements. For example, the drive unit tends to be rather mechanically complex, requiring the shaft-and-belt arrangement to transfer the driving force of the motor to each of the tightening bolts. This mechanically complexity increases cost and can also raise concerns both from a hygienic design and from a safety point of view. This known arrangement is also not well suited to allow control and feedback of torque, speed and number of rotations of each individual tightening bolt.

SUMMARY

The heat exchanger disclosed here includes a plurality of heat exchanger plates, a first end plate, a second end plate spaced apart from the first end plate, with the plurality of heat exchanger plates positioned between the first and second end plates, a plurality of motors that collectively define a drive unit, and a plurality of threaded tightening bolts that each extend between the first end plate and the drive unit, and that each extend through the second end plate. The threaded tightening bolts each include a respective bolt head that bears directly or indirectly against either the first end plate or the second end plate. A plurality of nuts are also provided, each in threaded engagement with a respective one of the threaded tightening bolts and arranged to bear directly or indirectly against either the second end plate or the first end plate so that the bolt head and the nut associated with each respective threaded tightening bolt bear directly or indirectly against different ones of the first and second end plates. The threaded tightening bolts and the nuts are arranged for relative movement of the first and second end plates towards or away from each other, and each of the is motors is operatively connected to a respective one of the threaded tightening bolts so that each of the threaded tightening bolts is rotatable independently of others of the threaded tightening bolts. The bolt heads and the nuts are coupled to the respective end plates in a manner such that the bolt heads and nuts are prevented from moving axially away from their respective end plates upon operation of the respective motors.

According to another aspect, a plate heat exchanger comprises: two end plates spaced apart from one another; a package of heat exchanger plates positioned between the two end plates; and a plurality of threaded tightening bolts that each extend from one of the end plates and through the other end plate. The threaded tightening bolts each include a respective bolt head that is associated with and bears directly or indirectly against a first of the two end plates. The plate heat exchanger also comprises a plurality of motors as well as a plurality of nuts each in threaded engagement with a respective one of the threaded tightening bolts, with each nut being associated with and arranged to bear directly or indirectly against a second of the two end plates. The threaded tightening bolts and the nuts are arranged to effect relative movement of the first end plate and the second end plate towards or away from each other. The motors are each operatively connected to a respective one of the threaded tightening bolts so that each motor rotates the respective threaded tightening bolt to rotate each of the threaded tightening bolts independently of others of the threaded tightening bolts. The bolt heads and the nuts are operatively coupled to the first and second end plates respectively in a manner such that operation of the respective motors and rotation of the threaded bolts in one direction decreases a distance between the end plates while operation of the respective motors and rotation of the threaded bolts in an opposite direction to the one direction increases the distance between the end plates. The plurality of motors includes a number of motors, and the plurality of threaded bolts including a number of threaded tightening bolts, and the number of threaded tightening bolts is equal to the number of motors.

BRIEF DESCRIPTION OF THE DRAWINGS

The plate heat exchanger disclosed here will be described in more detail with reference to the accompanying drawings figures which are briefly described below.

FIG. 2 is a side view of a plate heat exchanger.

FIG. 3 is a perspective view of a plate heat exchanger, seen from a different angle than the plate heat exchanger of FIG. 1.

FIG. 6 is partial detailed view of a threaded bolt connection by which the threaded bolt is connected to a shaft of the drive unit.

FIG. 7 is a partial detailed view of a first bearing unit which may be used in the disclosed plate heat exchanger.

FIG. 8 is partial detailed view of a second bearing unit.

FIG. 9 is another partial detailed view of the second bearing unit.

FIG. 13 is a cross sectional view of a shaft connection.

FIGS. 14a-14c are different detailed views of a nut fixation device.

FIGS. 15a-15b are different detailed views of the bearing unit which may be used in the disclosed plate heat exchanger.

DETAILED DESCRIPTION

Set forth below with reference to the accompanying drawings is a detailed description of embodiments of a plate heat exchanger and manner of operation representing examples of the plate heat exchanger and manner of operation disclosed here. The relative dimensions or scales on the drawings may be exaggerated or different from actuality/reality for convenience of description and illustration.

Heat exchangers are used for transferring heat between two fluids separated by a solid body. Heat exchangers can be of several types, the most common of which are spiral heat exchangers, tubular heat exchangers and plate heat exchangers. Plate heat exchangers are used to transfer heat between a hot and a cold fluid that are flowing in alternate flow passages formed between a set of heat exchanger plates. The arrangement of heat exchanger plates defined above is enclosed between end plates that are relatively thicker than the heat exchanger plates. The inner surface of each end plate faces the heat transfer plates.

Figure 1:
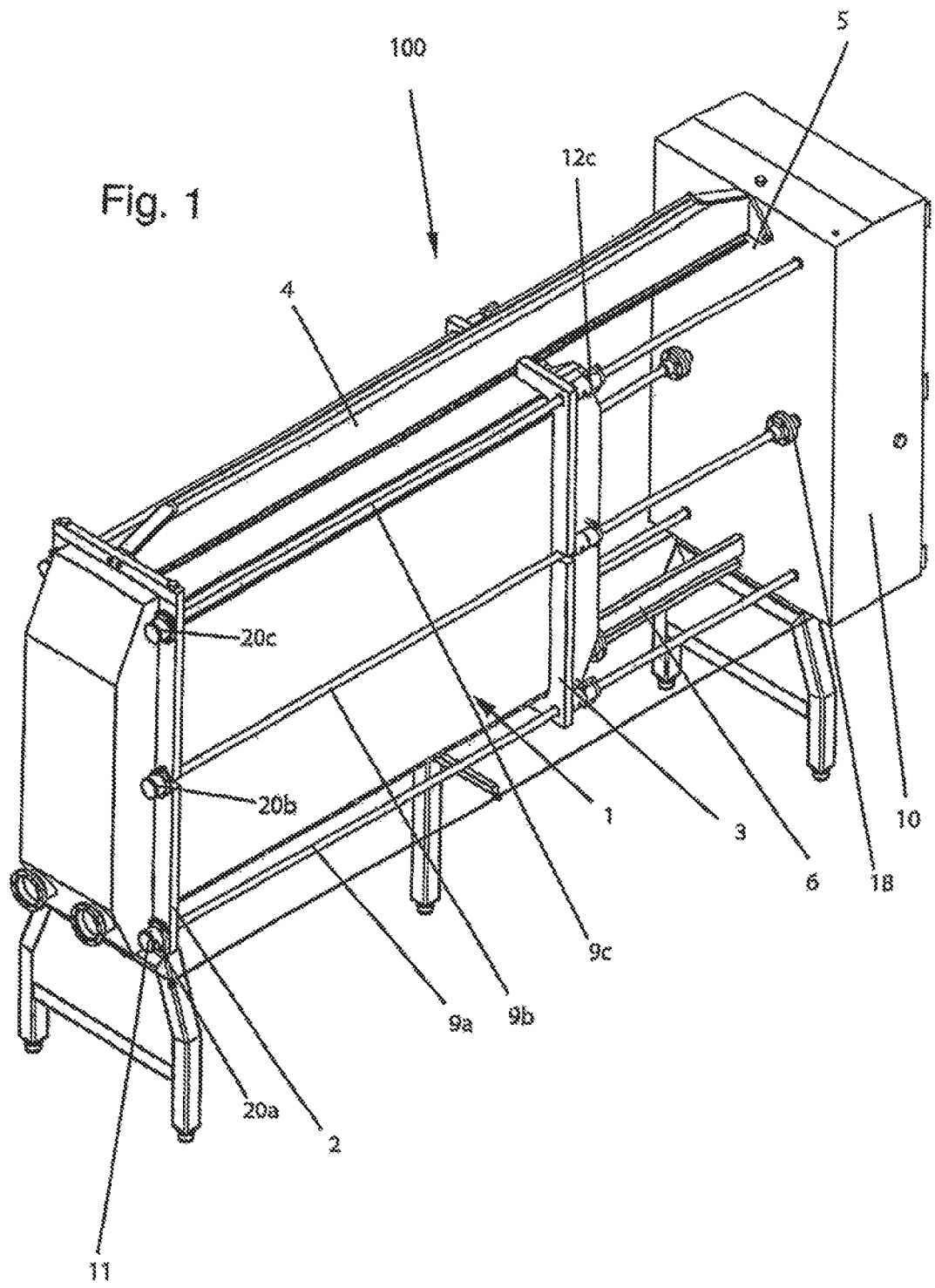
FIG. 1 is a perspective view of a plate heat exchanger disclosed here.

FIG. 1 shows a plate heat exchanger 100 comprising a plurality (package) of heat transferring plates 1, which are kept together between two end plates 2 and 3. The heat exchanger plates or heat transferring plates 1 hang on a carrying bar 4 that substantially extends between the two end plates 2, 3. One end of the carrying bar 4 is fixedly attached to the upper end of the end plate 2 and at the opposite end is fixedly attached to the upper end of a support column 5. The end plate 3, which is movable along the carrying bar 4, is used to press the heat exchanger plates 1 together to form a plate package. Thus, in this illustrated embodiment of the plate heat exchanger representing one example of the disclosed plate heat exchanger, the end plate 2 is a fixed end plate and the end plate 3 is a movable end plate. A guide bar 6 guides the heat exchanger plates 1 in their lower end. The guide bar 6 connects the lower end of the support column 5 with the lower end of the end plate 2. In FIGS. 1-3 the plate package is shown as schematic box. The plate package is housed in or covered by a cover to protect from dirt and the like.

Each of the heat exchanger plates 1 discussed above includes, in a manner known per se, a corrugation or pattern for increasing the heat transfer and a number of port holes, typically four, for forming a corresponding number of port channels extending through the plate package and for connection with the flow passages formed between the heat exchanger plates 1.

The end plate 2 is suitably provided with a number of ports or connections corresponding to the port holes of the heat exchanger plate 1. The other end plate 3 are also provided with a number of ports or connections corresponding to the port holes of the heat exchanger plate 1.The ports of the end plate 2 are each be provided with a blind cover.

Flexible gaskets 8 (best shown in FIG. 5) are positioned between adjacent heat exchanger plates 1 for defining the flow passages between adjacent heat exchanger plates 1 that receive two heat exchange fluids. The gaskets 8, which are preferably made of an elastic material, e.g. rubber material, are each disposed in a groove which extends along the periphery of the constituent heat exchanger plates 1 and around the port holes extending through the heat exchanger plates 1. The gaskets 8 may possibly comprise a metal or be surrounded by a second material, e.g. metal, PTFE, etc.

Figure 10:
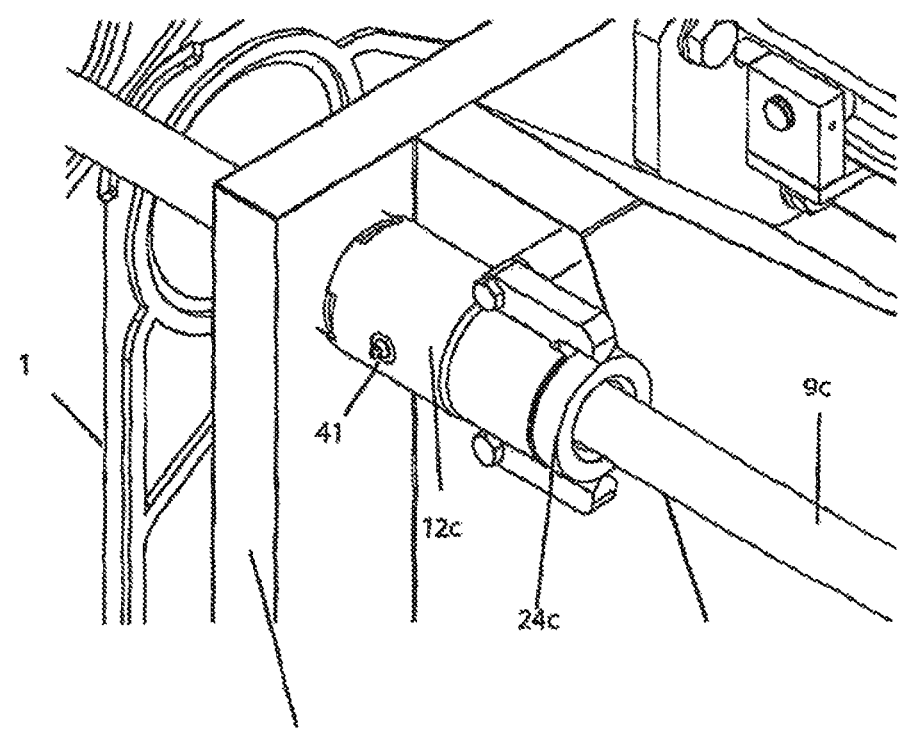
FIG. 10 is partial detailed view of a first nut arranged on one of the end plates.
Figure 11:
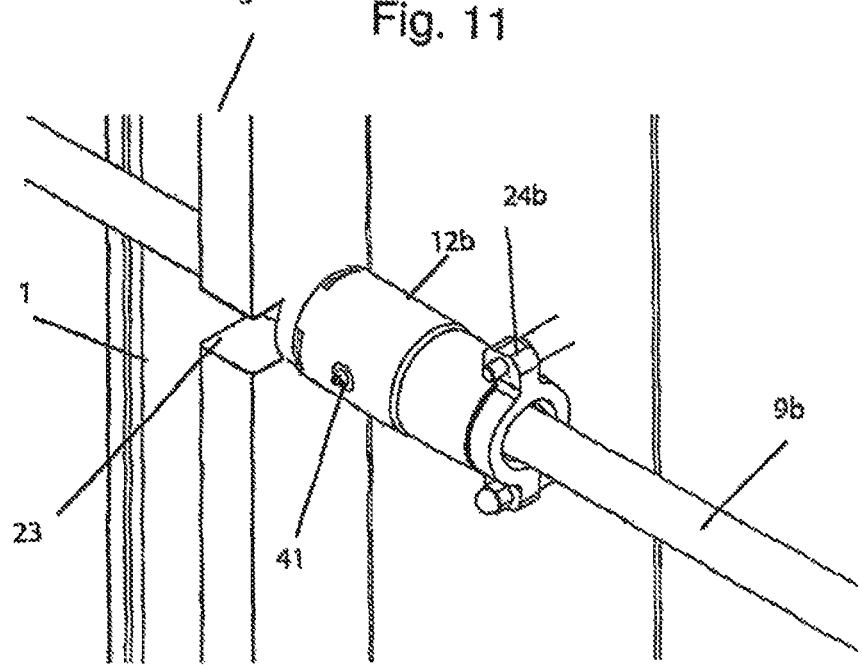
FIG. 11 is partial detailed view of a second nut arranged on one end plate.

As mentioned above, the movable end plate 3 is pressed or moved towards the fixed end plate 2 to form a plate package of the heat exchanger plates 1 positioned between the fixed end plate 2 and the movable end plate 3. Threaded tightening bolts 9 are used to keep the heat exchanger plates 1 together. The tightening bolts 9 extend between one of the end plates (the fixed end plate 2 in the illustrated example) and a drive unit 10 arranged on the support column 5. The tightening bolts 9 also pass through holes, recesses or cut-outs in the longer sides of the two end plates 2, 3. Each tightening bolt 9 includes a bolt head (bolt head means) 11 at one of its ends, possibly situated at the outside of (or integrated in) the end plate 2 as shown in FIGS. 7-9. Each tightening bolt 9 also carries a nut on its threaded part, possibly situated at the outside of (or integrated in) the end plate 3 as depicted in FIGS. 10 and 11 which depict two of the nuts 12b, 12c. As seen in FIGS. 1-5 and 12, the plate heat exchanger is configured so that three tightening bolts 9a, 9b, 9c are positioned on each of the longer sides of the plate package and the longer sides of the heat exchanger plates 1 forming the plate package.

Figure 12:
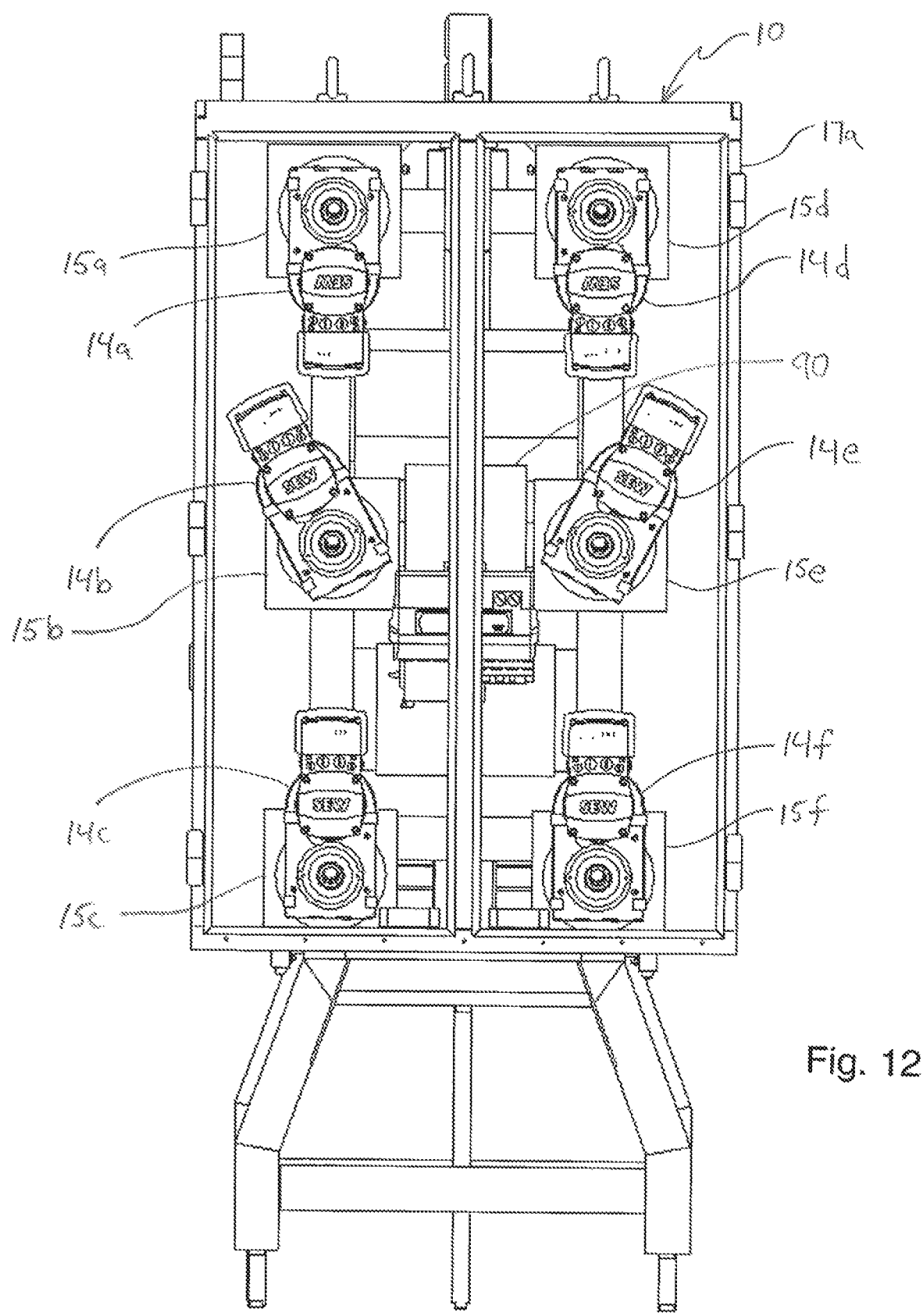
FIG. 12 is perspective view of a drive unit positioned in a cabinet (shown in the open condition) and forming a part of the disclosed plate heat exchanger.

The drive unit disclosed here is comprised of a plurality of electrical motors, each associated with and operatively connected to at least one tightening bolt. The drive unit may include two motors, three motors or more. Referring to FIG. 12, the drive unit 10 in the disclosed embodiment is comprised of six motors 14a, 14b, 14c, 14d, 14e, 14f each associated with and operatively connected to one of the six tightening bolts 9 so that operation of each motor rotates the associated tightening bolt 9. As illustrated, the six motors 14a, 14b, 14c, 14d, 14e, 14f are arranged in two sets, one set of three vertically arranged motors and another set of three vertically arranged motors. Each of the motors 14a, 14b, 14c, 14d, 14e, 14f is mounted on the end of the associated tightening bolt 9. The drive unit 10 comprised of the motors 14a, 14b, 14c, 14d, 14e, 14f thus exhibits a relatively simple and compact construction. The motors 14a, 14b, 14c, 14d, 14e, 14f are each mounted or positioned in a housing or cabinet 17a. In the embodiment disclosed by way of example, the motors 14a, 14b, 14c, 14d, 14e, 14f are housed or positioned in a common housing or cabinet 17a. In the illustrated embodiment, the housing/cabinet is provided with a cover or hinged door(s) 17b as shown in FIG. 3 that closes the interior of the housing 17a.

The electrical motors 14a, 14b, 14c, 14d, 14e, 14f may be electrical servo motors. The servo motors may be servo motors with a hygienic design or servo motors without a hygienic design. When using servo motors without a hygienic design, the servo motors should preferably be housed in cabinet like the cabinet 17a shown in FIG. 12. When using servo motors with a hygienic design, the servo motors need not be housed in a cabinet or other enclosure, but may instead be mounted on, for example, a frame, particularly a frame that is not enclosed. FIG. 12 depicts an example utilizing servo motors without a hygienic design in which the servo motors are enclosed in an enclosure or cabinet 17a together with the electronic control.

Each of the servo motors may be provided with appropriate gearing to achieve direct drive of the threaded bolts without requiring excessively large servo motors. The gearing also facilitates smooth start and stop of the rotation of the tightening bolts. FIG. 12 illustrates the gearing 15a, 15b, 15c, 15d, 15e, 15f operatively associated with each of the respective servo motors 14a, 14b, 14c, 14d, 14e, 14f.

To be able to remove, replace or insert heat exchanger plates 1 of the plate heat exchanger, at least one tightening bolt 9 on one side of the plate package may be removable, preferably the intermediate tightening bolts 9b located vertically between the other two tightening bolts 9a and 9c. The removable tightening bolt 9b may be located on any side of the plate package. If only one removable tightening bolt 9b is provided it can be located according to the preference of the user. In the illustrated embodiment representing an example of the disclosed plate heat exchanger, the removable tightening bolt is positioned on the longer side of the plate package. The plate heat exchanger may include two or more removable tightening bolts 9b. In the illustrated embodiment, the plate heat exchanger includes a total of two removable tightening bolts 9b, one of which is positioned on one of the longer sides of the plate package and the other of which is positioned on the opposite longer side of the plate heat exchanger.

Each removable bolt 9b is equipped with one shaft connection 18 (see FIGS. 6 and 13) between the drive unit 10 and the movable end plate 3. The shaft connection 18 is configured in a manner so that the removable bolt 9b can be rather easily separated from a shaft 19 of the drive unit 10 without moving the removable bolt 9b axially. The shaft 19 is operatively connected to the drive unit 10 so that operation of the drive unit 10 results in rotation of the shaft 19 and the removable bolt 9b. FIGS. 6 and 13 illustrate one possible shaft connection, but other shaft connections are also possible. FIG. 13 shows that the shaft connection 18 comprises two parts 18a, 18b that are put together or connected by a screw joint 30. The parts 18a, 18b are typically clamped onto the removable bolt 9b and the shaft 19, respectively.

As discussed above, each tightening bolt 9 includes a bolt head (bolt head means) 11 situated at the end plate 2 (see FIGS. 1-5 and 7-9). The bolt head 11 comprises a bearing unit 20, 20a, 20b, 20c on the end plate that supports the associated bolt 9, 9a, 9b, 9c, and takes up the axial forces.

The end plate 2 includes a cut-out or recess 21 (see FIGS. 1, 8 and 9) located on each of the longer sides of the end plate 2 allowing the removable bolts 9b to be removed radially (i.e., laterally to the side). Each bearing unit 20 may be fixed to the end plate 2, for example by screws, locking pins or other attaching means 60, to axially support each bearing unit 20 when the movable end plate 3 is moved relative to the end plate 2. The center located bearing unit 20b on each of the longer sides of the end plate 2 (i.e., the bearing unit 20b positioned between the bearing units 20a, 20c on each longer side of the end plate 2) comes off together with the associated bolt 9b. By virtue of the cut-outs or recesses 21 in the end plate 2 and cut-outs 40 in a bearing housing plate 22 of each bearing unit 20b (see FIGS. 15a and 15b), the entire bolt 9b and associated bearing unit 20b may be slid out radially from the end plate 2.

Figure 5:
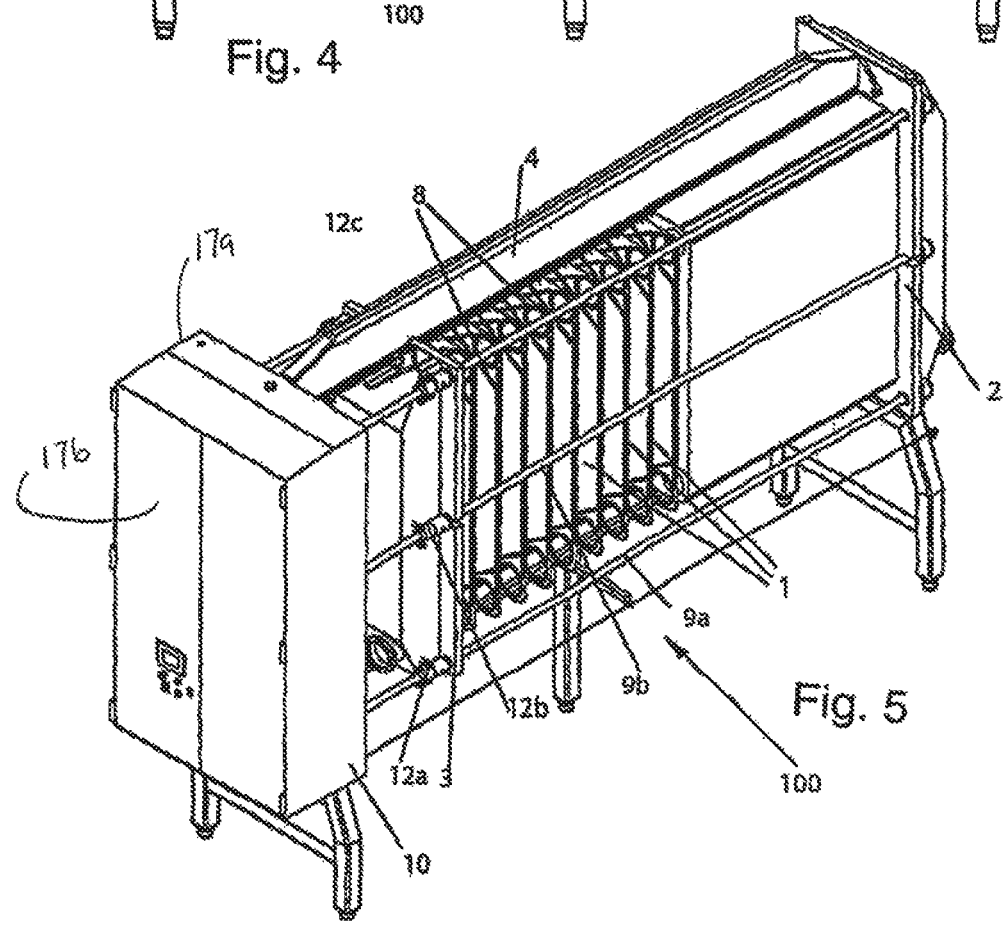
FIG. 5 is a perspective view of a plate heat exchanger in which the plate heat exchanger is open.

The end plate 2 has holes located in each corner of the end plate 2, as depicted in FIGS. 3 and 5, to receive the tightening bolts 9a, 9c. The bearing units 20a, 20c supporting the tightening bolts 9a, 9c may be fixed to the end plate 2, for example by screws, locking pins or other attaching means, to support the bearing units 20a, 20c axially when the movable end plate 3 is moved relative to the end plate 2.

The nuts 12, such as shown in FIGS. 10 and 11, on the threaded part of the tightening bolts 9 that are situated at the outside of the end plate 3 rest towards a flat surface of the end plate 3 which takes up the axial forces of the plate package, resulting from gasket forces and the pressure of the process media. The end plate 3 has a cut-out or recess 23, as illustrated in FIGS. 1 and 11, located on each of the longer sides of the end plate 3 allowing the removable tightening bolt 9b to be removed radially.

Each of the nuts 12, 12a, 12b, 12c is attached to the end plate 3 by a respective nut fixing device 24, 24a, 24b, 24c such as shown in FIGS. 10, 11, 14b, 14c. The nut fixing device 24b is easily unscrewed from the end plate 3 to allow the nut 12b to be removed together with the bolt 9b. The function of the nut fixation device 24 is to lock the rotation of the nut 12 and to fix the nut 12 axially to the end plate 3 when moving backwards (away from the end plate 2) in an unloaded mode and to keep the nuts 12 synchronized axially.

FIG. 14a shows the nut fixing device 24b from the behind. FIGS. 14b and 14c show cross sectional views of the nut fixing device 24b seen along the section lines 14b-14b and 14c-14c, respectively, of FIG. 14a.

The nut fixation device 24 allows the nut 12 to only be mounted in two positions, separated rotationally 180° from one another. The tolerances of the fixation mounting screws are smaller than half the thread elevation of the bolt 9b. This combination helps guarantee that the nut 12b is correctly refitted and synchronized. As seen from FIGS. 10 and 11, the nut fixing devices 24a-24c may be slightly differently designed, but they all fulfill the same purpose.

The nut 12 provided at the end plate 3 is designed to take up deviations both radially and in alignment. The nut 12 rests on spherical washers 25 as illustrated in FIGS. 14b and 14c, thus allowing the nut 12 to incline and follow the angle of the bolt 9. This helps reduce unnecessary forces on the threads when the frame is flexing due to the weight of the different components. This feature is especially important when using bolts 9 with threads of low elevation, "M"-thread or similar. A low elevation of the threads helps keep the bolt torque low when closing the plate heat exchanger 100.

The nut 12 is allowed to move radially as a hole through the end plate 3 is sized to possess a clearance relative to the bolt 9. The nut 12 has groove for rotational fixation which fits to the fixation device 24. The groove is mounted vertically to allow the nut 12 to slide and incline mainly in vertical direction, the direction which is most likely to deviate. The flexible design is made to allow the nut 12 mainly (only) to take up the axial forces created by the gaskets 8 and media pressure and not be stressed by any forces created by tolerances in the frame.

The open design of the nut assembly (12, 24, 25) provides for relatively easy inspection and cleaning, and the clearance between all components allow cleaning water to flush out of the design. This may make seals unnecessary. The nut 12 may be equipped with a grease nipple 41 to allow the threads inside the nut 12 to be properly lubricated.

Now the operation of the plate heat exchanger 100 will be briefly described. The operation of each electrical motor 14a, 14b, 14c, 14d, 14e, 14f produces a rotational output that is applied to the respective threaded bolt. All of the threaded bolts 9 may thus rotate at the same time, and at the same speed if the motors 14a, 14b, 14c, 14d, 14e, 14f are controlled to effect such a result. Because the nuts 12 are connected to or fixed relative to the end plate 3 and the bolt heads 11 are connected to or fixed relative to the end plate 2 in the above described manner according to the illustrated embodiment representing one example of the disclosed heat exchanger, the end plate 3 during all of its movement will be maintained in a position in which the end plate 3 is parallel with the end plate 2. The package of heat exchanger plates 1 will thus be compressed and opened to the same degree along its entire circumference. That is, if the plate heat exchanger 100 is in the closed configuration and the motors 14a, 14b, 14c, 14d, 14e, 14f are operated to rotate the threaded bolts, the movable end plate 3 will move away from the fixed end plate 2 (i.e., the distance between the end plates 2, 3 will increase), thus opening the plate heat exchanger. On the other hand, if the plate heat exchanger 100 is in the open configuration and the motors 14a, 14b, 14c, 14d, 14e, 14f are operated to rotate the threaded bolts, the movable end plate 3 will move toward the fixed end plate 2 (i.e., the distance between the end plates 2, 3 will decrease), thus closing the plate heat exchanger.

When the plate heat exchanger 100 is opened, the tightening bolt/bolts 9b can be removed to enable full access to the heat exchanger plates 1. It is thus possible to remove heat exchanger plates 1 from the plate heat exchanger 100 for cleaning, inspection or the like of the heat exchanger plates 1. The opening of the heat exchanger also enables the insertion of more heat exchanger plates 1 or the insertion of cleaned, inspected or exchanged heat exchanger plates 1.

The bolt 9b is removed from the plate heat exchanger 100 by disconnecting the shaft connection 18 between the drive unit 10 and the movable end plate 3; unfastening both the bearing unit 20b from the end plate 2 and the nut fixation device 24b from the end plate 3, and removing the bolt 9b radially with its connected parts. This same procedure may be used to remove other removable bolts from the plate heat exchanger 100 such as the removable bolt on the opposite side of the plate package. After the heat exchanger plates 1 are maintained, as desired the process is reversed and the tightening bolt or bolts 9b are re-installed and the parts are fastened. The drive unit 10 moves the movable end plate 3 towards the fixed end plate 2, pressing the heat exchanger plates 1 together to again form the plate package and making the plate heat exchanger 100 ready for operation.

Figure 4:
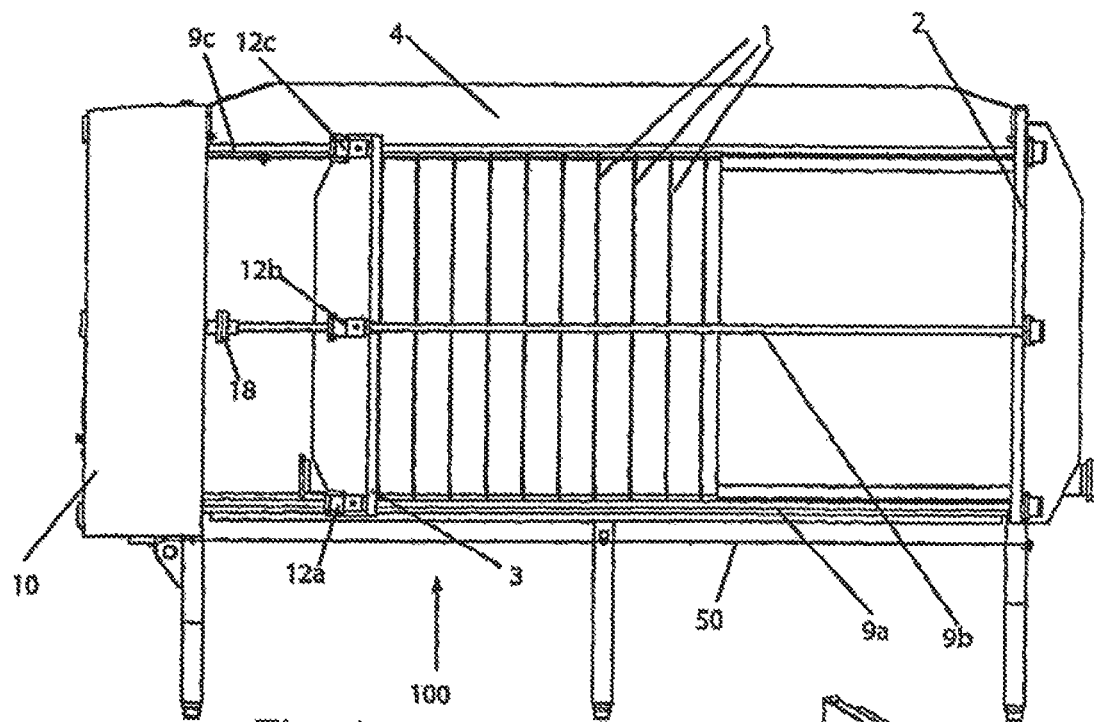
FIG. 4 is a side view of a plate heat exchanger in which the plate heat exchanger is open.

FIGS. 4 and 5 schematically illustrate a plate heat exchanger 100 opened for inspection or cleaning of the heat exchanger plates 1.

Along the frame of the plate heat exchanger 100 a safety switch is mounted in the form of a line breaker 50 or a light barrier following the sides of the plate heat exchanger 100 as shown in FIGS. 2-4. This makes it possible for an operator to stop the movement of the end plate 3 from any position around the plate heat exchanger 100.

The drive unit 10 forming a part of the plate heat exchanger 100 disclosed here and comprised of the individual motors each operatively connected to one of the threaded bolts 9 possesses a relatively simple construction for rotationally driving or rotating each of the threaded bolts 9. A smaller housing or cabinet is thus possible. There are no moving parts in the housing or cabinet 17a that houses the motors 14a, 14b, 14c, 14d, 14e, 14f. The drive unit 10 does not include shaft-and-belt arrangements for transferring rotational operation of the motors or other moving parts. A hygienic design of the driving unit 10 is thus possible. Such a hygienic design also makes it possible to mount the motors and associated gear boxes externally, and to have a separate electronic cabinet or housing.

The drive unit 10 forming a part of the plate heat exchanger 100 here allows each of the threaded tightening bolts to be rotated by way of a dedicated motor. The drive unit construction here is also significantly less costly than a solution involving shaft-and-belt arrangements and other movable parts.

The drive unit 10 with individual motors 14a, 14b, 14c, 14d, 14e, 14f each rotatably driving a respective one of the threaded tightening bolts makes it possible to apply the same closing force every time regardless of the number of plates and any geometrical variations that may exist between different heat exchange plates. The force required to close the package of plates and achieve the A-dimension (which A-dimension typically remains constant) may vary over time depending upon, for example, gasket wear. The A-dimension refers to the dimension between the inner surfaces of the end plates 2, 3 (or the sum of the dimensions between the inner surfaces of all adjacent heat transfer plates when in metal to metal contact). The torque applied by the motors depends on the force required to close the package of heat exchange plates and achieve the A-dimension. Also, the torque applied to the middle (vertically middle) threaded tightening bolts may be less than the torque applied to the other threaded tightening bolts (corner threaded tightening bolts) because the middle threaded tightening bolts typically may not require as much force to close as the corner threaded tightening bolts.

The configuration of the drive unit allows application of individual torque or distance control on each of the threaded tightening bolts. That is, the torque applied to each threaded tightening bolt by the respective servo motor can be varied depending upon the circumstances and particular application, and possibly also based on feedback received about rotation of the threaded tightening bolts. Also, using torque/distance feedback, it is possible to predict necessary gasket service. Gasket lifetime prediction may also be possible.

The plate heat exchanger may also be configured to include a hybrid system for tightening/loosening the tightening bolts. For example, a hybrid system may be employed utilizing the combination of an automated closing process and a manual closing process in which motors are used on some of the tightening bolts, but not all of the tightening bolts. For a relatively smaller plate heat exchanger, it might be possible to use two (2) motors for rotating two of the tightening bolts, while relatively larger plate heat exchangers might require four (4) motors. The largest plate heat exchangers could then utilize one motor for each tightening bolt. Of course, different variations might be employed depending upon the total number of tightening bolts in the plate heat exchanger. The tightening bolts not operated by motor can be closed manually as the last closed tightening bolts. If the motors are sufficiently powerful to provide the proper torque with the right balance of motor and gear box, the requirement for motors may be in pairs rather than one per bolt so that two tightening bolts are operated by a common motor.

Figure 16:
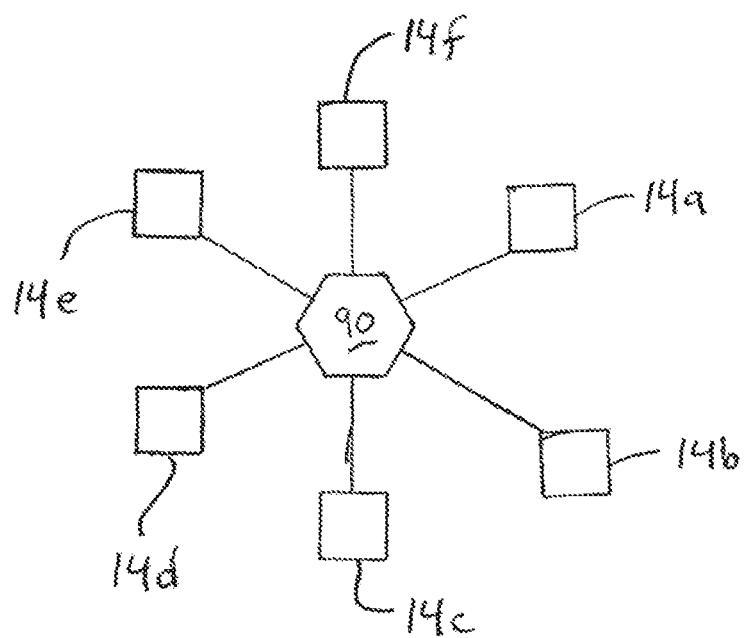
FIG. 16 is a schematic illustration of a controller that is operatively connected to each of the motors to control operation of the motors.

FIG. 16 schematically illustrates that each of the motors 14A, 14B, 14C, 14D, 14E, 14F is operatively connected to a controller 90. The controller 90 may be in the form of a computer, microprocessor or the like. The controller can be configured (programmed) to receive input about the rotation of the threaded tightening bolts 9 and/or movement of the movable end plate 3, and to control operation of the motors, on an individualized basis, based on the input so that the threaded tightening bolts are rotated to achieve certain desired results.

In the described embodiments the plate heat exchanger 100 is provided with three tightening bolts on each side of the plate package, one of which is the removable tightening bolt. The number and positions of the tightening bolts is decided based upon most cost effective design of the drive unit and the heat exchanger plates, and therefore there may be further tightening bolts if that is needed in view of the construction of the plate heat exchanger and the work that it to be performed.

Therefore more than one tightening bolt may be needed to be removed to allow the heat exchanger plates to be taken out or inserted in the plate heat exchanger. When a tightening bolt with nut is removed it is preferably refitted in a manner that helps guarantee that the synchronized position between the different nuts of the movable end plate is unchanged. Otherwise the result may be that the plate package is unaligned with leaking gaskets or seized/worn threads as result.

The above described connection of the bolt heads and the nuts with the respective end plates may be accomplished in many different ways within the scope of the present invention.

By having a partially removable tightening bolt a simple construction can be achieved since the drive unit will not be affected by the removal of the removable part of the tightening bolt because the shaft (the second part of the tightening bolt) remains connected to the drive unit after the removal of the removable part of the tightening bolt.

The drive unit is located as far away as possible from the plate package to avoid that the drive unit is exposed to heat from the process.

The detailed description above describes a plate heat exchanger and manner of operation representing examples of the inventive plate heat exchanger and manner of operation disclosed here. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A plate heat exchanger comprising:
   a plurality of heat exchanger plates;
   a first end plate;
   a second end plate spaced apart from the first end plate, the plurality of heat exchanger plates being positioned between the first and second end plates;
   a plurality of motors that collectively define a drive unit;
   a plurality of threaded tightening bolts that each extend between the first end plate and the drive unit, each of the threaded tightening bolts also extending through the second end plate;
   the threaded tightening bolts each including a respective bolt head that bears directly or indirectly against either the first end plate or the second end plate;
   a plurality of nuts, each in threaded engagement with a respective one of the threaded tightening bolts and arranged to bear directly or indirectly against either the second end plate or the first end plate so that the bolt head and the nut associated with each respective threaded tightening bolt bear directly or indirectly against different ones of the first and second end plates;
   the threaded tightening bolts and nuts being arranged for relative movement of the first and second end plates towards or away from each other; and
   each of the plurality of motors being operatively connected to a respective one of the threaded tightening bolts so that each of the threaded tightening bolts is rotatable independently of others of the threaded tightening bolts, the bolt heads and the nuts being operatively coupled to the respective end plates in a manner such that operation of the respective motors and rotation of the threaded bolts in one direction decreases a distance between the end plates while operation of the respective motors and rotation of the threaded bolts in an opposite direction to the one direction increases the distance between the end plates.

2. The plate heat exchanger according to claim 1, wherein the plurality of threaded tightening bolts includes more than two threaded tightening bolts, and the plurality of motors includes more than two motors.

3. The plate heat exchanger according to claim 1, wherein the plurality of threaded tightening bolts includes more than three threaded tightening bolts, and the plurality of motors includes more than three motors.

4. The plate heat exchanger according to claim 1, in which at least one of the bolt heads is removably attached to the respective end plate against which the at least one bolt head directly or indirectly bears.

5. The plate heat exchanger according to claim 1, wherein each of the first and second end plates possesses a pair of oppositely positioned relatively longer sides and a pair of oppositely positioned relatively shorter sides, and each of the first and second end plates includes a recess on one of the relatively longer sides, at least one of the threaded tightening bolts being positioned in the recess.

6. The plate heat exchanger according to claim 5, wherein the at least one threaded tightening bolt positioned in the recess is a removable threaded tightening bolt that is removable from the recess.

7. A plate heat exchanger according to claim 1, wherein each of the plurality of motors is mounted in a housing.

8. The plate heat exchanger according to claim 1, wherein all of the plurality of motors are mounted in a common housing.

9. The plate heat exchanger according to claim 1, wherein the bolt heads and the nuts are fixed relative to the respective end plates to lock rotation of the bolt heads and the nuts relative to the respective end plates.

10. A plate heat exchanger comprising:
    two end plates spaced apart from one another;
    a package of heat exchanger plates positioned between the two end plates;
    a plurality of threaded tightening bolts that each extend from one of the end plates and through the other end plate;
    the threaded tightening bolts each including a respective bolt head that is associated with and bears directly or indirectly against a first of the two end plates;

a plurality of nuts each in threaded engagement with a respective one of the threaded tightening bolts, each of the nuts being associated with and arranged to bear directly or indirectly against a second of the two end plates;

the threaded tightening bolts and the nuts being arranged to effect relative movement of the first end plate and the second end plate towards or away from each other;

a plurality of motors each operatively connected to a respective one of the threaded tightening bolts so that each motor rotates the respective threaded tightening bolt to rotate each of the threaded tightening bolts independently of others of the threaded tightening bolts, the bolt heads and the nuts being operatively coupled to the first and second end plates respectively in a manner such that operation of the respective motors and rotation of the threaded bolts in one direction decreases a distance between the end plates while operation of the respective motors and rotation of the threaded bolts in an opposite direction to the one direction increases the distance between the end plates;

the plurality of motors including a number of motors, the plurality of threaded bolts including a number of threaded tightening bolts; and the number of threaded tightening bolts being equal to the number of motors.

11. The plate heat exchanger according to claim 10, wherein the plurality of motors includes more than two motors.

12. The plate heat exchanger according to claim 10, wherein the plurality of motors includes more than three motors.

13. The plate heat exchanger according to claim 10, in which at least one of the bolt heads is removably attached to the first end plate.

14. The plate heat exchanger according to claim 10, wherein each of the first and second end plates possesses a pair of oppositely positioned relatively longer sides and a pair of oppositely positioned relatively shorter sides, and each of the first and second end plates includes a recess on one of the relatively longer sides, at least one of the threaded tightening bolts being positioned in the recess.

15. The plate heat exchanger according to claim 14, wherein the at least one threaded tightening bolt positioned in the recess is a removable threaded tightening bolt.

16. A plate heat exchanger according to claim 10, wherein each of the plurality of motors is mounted in a housing.

17. The plate heat exchanger according to claim 10, wherein all of the motors are mounted in a common housing.

18. The plate heat exchanger according to claim 10, wherein the bolt heads and the nuts are fixed relative to the respective end plates to lock rotation of the bolt heads and the nuts relative to the respective end plates.

* * * * *